United States Patent
Yano et al.

(10) Patent No.: US 11,110,403 B2
(45) Date of Patent: Sep. 7, 2021

(54) METHOD FOR PRODUCING SEPARATION MEMBRANE USING MFI-TYPE ZEOLITE (SILICALITE)

(71) Applicant: HITACHI ZOSEN CORPORATION, Osaka (JP)

(72) Inventors: Kazuhiro Yano, Osaka (JP); Masaya Itakura, Osaka (JP); Kentaro Shinoya, Osaka (JP); Satoshi Imasaka, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 376 days.

(21) Appl. No.: 16/312,096

(22) PCT Filed: Jun. 13, 2017

(86) PCT No.: PCT/JP2017/021711
§ 371 (c)(1),
(2) Date: Dec. 20, 2018

(87) PCT Pub. No.: WO2017/221761
PCT Pub. Date: Dec. 28, 2017

(65) Prior Publication Data
US 2019/0160437 A1    May 30, 2019

(30) Foreign Application Priority Data

Jun. 21, 2016  (JP) .............. JP2016-122597

(51) Int. Cl.
*B01D 53/22* (2006.01)
*B01D 69/10* (2006.01)
(Continued)

(52) U.S. Cl.
CPC .......... *B01D 69/10* (2013.01); *B01D 53/228* (2013.01); *B01D 67/0051* (2013.01);
(Continued)

(58) Field of Classification Search
CPC .. B01D 69/12; B01D 2325/20; B01D 71/028; B01D 67/0051; B01D 69/10;
(Continued)

(56) References Cited

U.S. PATENT DOCUMENTS

| 5,177,373 A | 1/1993 | Nakamura |
| 5,716,527 A * | 2/1998 | Deckman ............. B01J 37/0244 210/651 |

(Continued)

FOREIGN PATENT DOCUMENTS

| JP | 2000-507909 A | 6/2000 |
| JP | 2002-249313 A | 9/2002 |

(Continued)

OTHER PUBLICATIONS

International Search Report PCT/JP2017/021711 dated Jul. 25, 2017 with English translation.

(Continued)

*Primary Examiner* — Anthony R Shumate
(74) *Attorney, Agent, or Firm* — Pillsbury Winthrop Shaw Pittman, LLP

(57) ABSTRACT

Provided is a method for producing a separation membrane including a silicalite membrane without using NaOH or the like that causes an increase in cost with respect to equipment, facilities, and process time. The method for producing a separation membrane is a method for producing a separation membrane including a porous support and a silicalite membrane that is formed on the support and has an MFI-type zeolite crystal structure, and is characterized in that the method includes a step of producing a seed crystal, a step of attaching the seed crystal onto the porous support, a step of producing a membrane synthesis raw material composition containing $SiO_2$, an organic template, and $H_2O$, and a step of immersing the porous support having the seed crystal (Continued)

attached thereto in the membrane synthesis raw material composition and performing hydrothermal synthesis, and the composition ratio of the membrane synthesis raw material composition is as follows: $SiO_2$:organic template: $H_2O$=1:(0.05 to 0.15):(50 to 120).

4 Claims, 6 Drawing Sheets

(51) Int. Cl.
    *C01B 37/02*     (2006.01)
    *C04B 41/85*     (2006.01)
    *B01D 69/12*     (2006.01)
    *B01D 71/02*     (2006.01)
    *B01D 67/00*     (2006.01)

(52) U.S. Cl.
    CPC ............ *B01D 69/12* (2013.01); *B01D 71/02* (2013.01); *C01B 37/02* (2013.01); *C04B 41/85* (2013.01); *B01D 71/028* (2013.01); *B01D 2323/24* (2013.01); *B01D 2325/02* (2013.01); *B01D 2325/20* (2013.01)

(58) Field of Classification Search
    CPC ............ B01D 2325/02; B01D 2323/24; B01D 53/228; B01D 71/02; C01B 37/02; C04B 41/85
    See application file for complete search history.

(56) References Cited

U.S. PATENT DOCUMENTS

| | | | |
|---|---|---|---|
| 6,689,195 B1* | 2/2004 | Anthonis | B01D 67/0051 502/4 |
| 2002/0114958 A1 | 8/2002 | Ozeki et al. | |
| 2005/0014371 A1 | 1/2005 | Tsapatsis et al. | |
| 2007/0286800 A1* | 12/2007 | Zones | B01D 71/028 423/718 |
| 2012/0024777 A1* | 2/2012 | Sugita | B01D 69/125 210/500.25 |
| 2014/0360939 A1* | 12/2014 | Yamada | B01D 67/0093 210/638 |
| 2015/0044130 A1 | 2/2015 | Tang et al. | |
| 2015/0265975 A1* | 9/2015 | Liu | B22F 5/006 96/11 |
| 2016/0023187 A1 | 1/2016 | Hedlund et al. | |
| 2017/0036175 A1* | 2/2017 | Tanabe | B01D 69/04 |
| 2017/0296980 A1* | 10/2017 | Noda | B01J 20/3265 |
| 2017/0296983 A1* | 10/2017 | Noda | B01D 71/028 |
| 2017/0312702 A1* | 11/2017 | Shahsavari | B01J 20/28007 |
| 2019/0160437 A1* | 5/2019 | Yano | B01D 53/228 |
| 2019/0262779 A1* | 8/2019 | Gu | C01B 39/54 |
| 2020/0114307 A1* | 4/2020 | Tanaka | B01D 53/228 |

FOREIGN PATENT DOCUMENTS

| | | |
|---|---|---|
| JP | 2016-098205 A | 5/2016 |
| JP | 2016-515921 A | 6/2016 |
| WO | 2016/084651 A1 | 6/2016 |

OTHER PUBLICATIONS

Tsuneji Sano et al., "Separation of methanol/methyl-tea-butyl ether mixture by pervaporation using silicalite membrane" Journal of Membrane Science 107 (1995) 193-196.

Y. Hasegawa et al., "Preparation and characterization of silicalite-1 membranes prepared by secondary growth of seeds with different crystal sizes", Journal of Membrane Science 280 (2006) 397-405.

H. Negishi et al., "Preparation of the silicalite membranes using a seeding technique under various hydrothermal conditions", Desalination 144 (2002) 47-52.

Notice of Reasons for Refusal dated Sep. 27, 2019 issued in corresponding Japanese Patent Application No. 2016-122597 with English translation.

Extended European Search Report dated Feb. 7, 2020 issued in corresponding EP Application No. 17815230.2.

\* cited by examiner

METHOD FOR PRODUCING SEPARATION MEMBRANE USING MFI-TYPE ZEOLITE (SILICALITE)

CROSS-REFERENCE TO RELATED APPLICATIONS

This application is the U.S. National Stage of PCT/JP2017/021711, filed Jun. 13, 2017, which in turn claims priority to Japanese Patent Application No. 2016-122597, filed Jun. 21, 2016. The contents of each of these applications are incorporated herein by reference in entirety.

TECHNICAL FIELD

The present invention relates to a method for producing a dense separation membrane for separating and purifying a synthesis gas system such as a hydrocarbon compound in the petrochemical field.

BACKGROUND ART

Conventionally, when silicalite is hydrothermally synthesized, sodium hydroxide (NaOH) is added as a mineralizing agent, and the alkalinity of the reaction solution is increased, and therefore, corrosion and deterioration of equipment or the like used in the synthesis step are caused, and also it is necessary to repeat washing for removing this alkali metal component after synthesis, resulting in an increase in cost with respect to equipment, facilities, and process time (see, for example, NPL 1 to NPL 3).

Furthermore, if the ratio of the surface layer pore diameter of a porous substrate to the seed crystal particle diameter for producing a silicalite separation membrane is not suitable, a membrane having high processing efficiency is not formed. NPL 2 describes that in a conventional silicalite membrane, while the surface layer portion pore diameter of a porous substrate (made of stainless steel) is 2 μm, the most suitable seed crystal particle diameter is 12 μm. However, the thickness of a dense layer at that time is from 198 to 223 μm, which is very large, and becomes resistance when a separation target passes through the dense layer, and therefore causing a decrease in processing efficiency (permeability) as a filter.

NPL 1: T. Sano et al., Journal of Membrane Science 107 (1995) 193-196
NPL 2: H. Negishi et al., Desalination 144 (2002) 47-52
NPL 3: Y. Hasegawa et al., Journal of Membrane Science 280 (2006) 397-405

SUMMARY OF INVENTION

Technical Problem

An object of the present invention is to provide a method for producing a separation membrane including a silicalite membrane without using NaOH that causes an increase in cost with respect to equipment, facilities, and process time, and to provide a method for producing a separation membrane including a dense silicalite membrane.

Solution to Problem

In order to achieve the above object, the present invention provides a method for producing a separation membrane having an MFI-type zeolite crystal structure on a porous support.

A first aspect of the present invention is a method for producing a separation membrane which includes a porous support and a silicalite membrane that is formed on the support and has an MFI-type zeolite crystal structure, characterized in that the method includes a step of producing a seed crystal, a step of attaching the seed crystal onto the porous support, a step of producing a membrane synthesis raw material composition containing $SiO_2$, an organic template, and $H_2O$, and a step of immersing the porous support having the seed crystal attached thereto in the membrane synthesis raw material composition and performing hydrothermal synthesis, and the composition ratio of the membrane synthesis raw material composition is as follows: $SiO_2$:organic template:$H_2O$=1:(0.05 to 0.15):(50 to 120).

A second aspect of the present invention is a method for producing a separation membrane, characterized in that the organic template used in the first aspect contains a hydroxy group.

A third aspect of the present invention is a method for producing a separation membrane, characterized in that the organic template containing a hydroxy group used in the second aspect is TPAOH (tetra-n-propylammonium hydroxide).

A fourth aspect of the present invention is the method for producing a separation membrane according to any one of the first aspect, the second aspect, and the third aspect, characterized in that the average particle diameter $d_{seed}$ of the seed crystal and the surface layer portion average pore diameter $d_{support}$ of the porous support have a relationship represented by the following formula 1.

$$1.5 < (d_{support}/d_{seed}) < 3.25 \quad \text{[Formula 1]}$$

The measurement of the average particle diameter of the silicalite seed crystal may be performed using a cumulant method, and the measurement of the surface layer portion average pore diameter of the porous support may be performed in accordance with JIS K 3832.

A fifth aspect of the present invention is the method for producing a separation membrane according to any one of the first aspect to the fourth aspect, characterized in that the porous support is composed of a ceramic material, and the average pore diameter of the porous support becomes smaller from the inside of the porous support toward the surface layer portion of the porous support having the silicalite membrane formed thereon.

A sixth aspect of the present invention is the method for producing a separation membrane according to the fifth aspect, characterized in that one end portion or both end portions in the longitudinal direction of the porous support are composed of a dense ceramic material.

Advantageous Effects of Invention

The present invention provides a method for producing a separation membrane without using NaOH that causes an increase in cost with respect to equipment, facilities, and process time in hydrothermal synthesis and a method for producing a separation membrane including a dense silicalite membrane.

DESCRIPTION OF EMBODIMENTS

Figure 1:
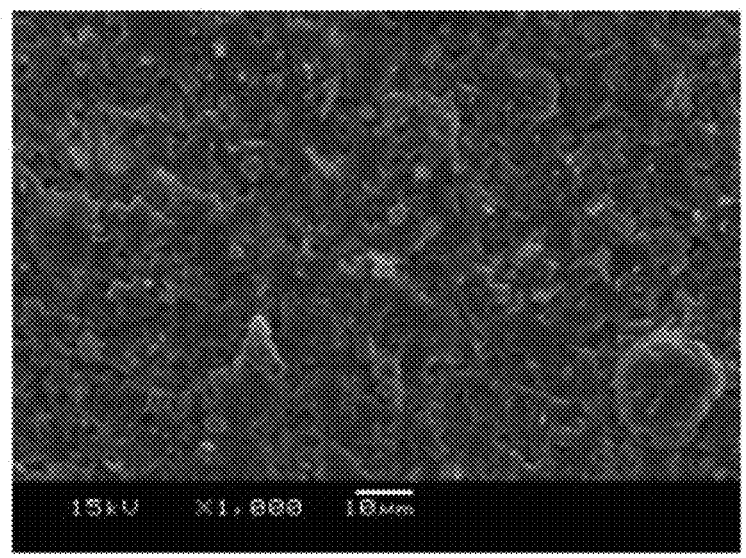
FIG. 1 is an electron microscopic image of a surface of a silicalite membrane obtained in Example 1.

Next, embodiments of the present invention will be described, however, the present invention is not limited thereto.

The separation membrane of the present invention is a separation membrane in which a silicalite membrane is formed on the surface of a porous support. The framework of the silicalite membrane crystal is substantially free of aluminum and is all composed of silicon and oxygen. Here, the MFI type structure as a zeolite framework is a zeolite framework having a 10-membered ring as a structure and is represented by, for example, silicalite-1.

Incidentally, the "MFI" is a classification code of zeolite specified based on the structure by the International Zeolite Association (IZA).

A method for producing a separation membrane includes a step of producing a seed crystal, a step of attaching the seed crystal to a porous support made of a material such as stainless steel or alumina, a step of producing a membrane synthesis raw material composition for synthesizing a silicalite membrane, and a step of immersing the porous support having the seed crystal attached thereto in the membrane synthesis raw material composition and performing hydrothermal synthesis.

<Step of Producing Seed Crystal>

A zeolite seed crystal can be synthesized, for example, by the following method.

Tetra-n-propylammonium hydroxide (TPAOH) and tetraethyl orthosilicate (TEOS) are added to an aqueous solution of sodium hydroxide (NaOH), whereby a mixed solution is prepared so that the molar composition of the mixed solution is as follows: $SiO_2$ (20 to 30):$Na_2O$ (0.05 to 0.15):TPAOH (4 to 5):$H_2O$ (900 to 1200):EtOH (90 to 110). Preferably, the mixed solution is prepared so that the molar composition is as follows: $SiO_2$ (25):$Na_2O$ (0.1):TPAOH (4.4):$H_2O$ (1098): EtOH (100).

After this mixed solution is stirred at room temperature for 24 hours, a hydrothermal synthesis reaction is performed while further stirring at 100° C. A powder obtained after synthesis is washed several times with distilled water, and then, solid-liquid separation is performed by centrifugation. A solid obtained after separation is dried at 100° C. for 24 hours, followed by firing at 500° C. for 8 hours, whereby a seed crystal is produced.

<Step of Attaching Seed Crystal to Porous Support>

The porous support having the seed crystal attached thereto may be any as long as zeolite can be crystallized in the form of a thin membrane on the support, and may be a porous support formed from alumina, silica, zirconia, titania, stainless steel, or the like.

The shape of the porous support is not particularly limited, and a porous support having any of various shapes such as a tubular shape, a plate shape, a honeycomb shape, a hollow fiber shape, and a pellet shape can be used. For example, in the case of a tubular shape, the size of the porous support is not particularly limited, however, practically, the length is from about 2 to 200 cm, the inner diameter is from 0.5 to 2 cm, and the thickness is from about 0.5 to 4 mm.

The porous support is preferably subjected to a surface treatment by a method such as water washing or ultrasonic washing before attaching the seed crystal. For example, the surface of the support may be washed by ultrasonic washing with water for 1 to 10 minutes. In order to improve the surface smoothness, the surface thereof may be polished using a sandpaper, a grinder, or the like.

A method of attaching the seed crystal to the porous support is performed by immersing the porous support in a suspension containing the seed crystal produced in the <Step of Producing Seed Crystal>, followed by drying at 60° C. for 12 hours. Of course, other than this, the method of attaching the seed crystal to the porous support may be performed by a method of applying the suspension to the surface of the porous support with a brush or the like, or other methods.

<Step of Producing Membrane Synthesis Raw Material Composition>

As a reaction solution, a solution is prepared using colloidal silica, an organic template, and distilled water so that the molar composition of the membrane synthesis raw material composition is as follows: $SiO_2$ (1):organic template (0.05 to 0.15):$H_2O$ (50 to 120).

The lower limit amount (parts by mass) of the organic template with respect to 1 part by mass of $SiO_2$ in the membrane synthesis raw material composition is preferably 0.05 parts by mass or more, more preferably 0.07 parts by mass or more, further more preferably 0.09 parts by mass or more.

The upper limit amount (parts by mass) of the organic template with respect to 1 part by mass of $SiO_2$ in the membrane synthesis raw material composition is preferably 0.15 parts by mass or less, more preferably 0.13 parts by mass or less, further more preferably 0.11 parts by mass or less.

The lower limit amount (parts by mass) of $H_2O$ with respect to 1 part by mass of $SiO_2$ in the membrane synthesis raw material composition is preferably 50 parts by mass or more, more preferably 60 parts by mass or more, further more preferably 70 parts by mass or more.

The upper limit amount (parts by mass) of $H_2O$ with respect to 1 part by mass of $SiO_2$ in the membrane synthesis raw material composition is preferably 120 parts by mass or less, more preferably 110 parts by mass or less, further more preferably 100 parts by mass or less.

When the amount (parts by mass) of the organic template with respect to 1 part by mass of $SiO_2$ in the membrane synthesis raw material composition is less than 0.05 or exceeds 0.15 parts by mass, or the amount (parts by mass) of $H_2O$ with respect to 1 part by mass of $SiO_2$ in the composition is less than 50 parts by mass or exceeds 120 parts by mass, the hydrothermal synthesis time may be prolonged or a dense silicalite membrane layer may not be formed.

<Step of Immersing Porous Support Having Seed Crystal Attached Thereto in Membrane Synthesis Raw Material Composition and Performing Hydrothermal Synthesis>

The membrane synthesis raw material composition produced in the <Step of Producing Membrane Synthesis Raw Material Composition> is stirred at room temperature for 30 minutes to 4 hours, and thereafter, the membrane synthesis raw material composition and the porous support having the zeolite seed crystal attached thereto are loaded in a heat and pressure resistant container such as an autoclave. After the container is sealed, hydrothermal synthesis is performed at a temperature of 130° C. to 180° C. for 12 to 36 hours. When the temperature is lower than 130° C. or exceeds 180° C., or the synthesis time is less than 12 hours or exceeds 36 hours, a dense silicalite membrane layer may not be formed or the hydrothermal synthesis time may be prolonged.

The porous support after hydrothermal synthesis is dried at 60° C. for 12 hours, followed by firing at 400° C. for 48 hours to remove the organic template, whereby a separation membrane in which the surface of the porous support is coated with the dense silicalite separation membrane is completed.

The obtained silicalite separation membrane is substantially free of aluminum, has an MFI-type crystal structure, high water resistance, high chemical resistance, and high processing efficiency.

In the above-mentioned production method, NaOH as a mineralizing agent is not used, and therefore, the effect of causing deterioration of equipment and facilities by the membrane synthesis raw material composition is small, the labor of a washing step or the like for removing NaOH after hydrothermal synthesis is saved, and the production cost can be reduced.

The reason why hydrothermal synthesis can be performed even without using NaOH as a mineralizing agent is considered to be because an OH group in the organic template functions as a mineralizing agent, and the organic template which also functions as a mineralizing agent may be any as long as it has an OH group.

The organic template is not particularly limited, but is preferably a quaternary alkylammonium hydroxide having 10 or more carbon atoms, and particularly preferably TPAOH. As another example, tripropyl ethylammonium (TPEAOH) is exemplified.

In order to form a denser layer by allowing the seed crystal to serve as a precursor for forming the silicalite separation membrane to penetrate inside the porous support and growing the crystal through hydrothermal synthesis, the relationship between the surface layer portion average pore diameter of the porous support and the average particle diameter of the seed crystal becomes important.

In order to allow the seed crystal to penetrate inside the porous support, the particle diameter of the seed crystal should be smaller than the pore diameter in the surface layer of the porous support.

On the other hand, if the average particle diameter of the seed crystal is too smaller than the surface layer portion average pore diameter of the porous support, the seed crystal penetrates deep in the pores of the porous support, and the surface of the porous support cannot be coated with the silicalite crystal grown in the subsequent hydrothermal synthesis step, and therefore, a dense layer may not be able to be formed.

As a result of repeatedly performing many experiments using the average particle diameter of the seed crystal and the surface layer portion average pore diameter of the porous support as parameters, the present inventors found that when the average particle diameter of the seed crystal and the surface layer portion average pore diameter of the porous support have a relationship satisfying the following formula 1, a dense silicalite membrane is formed. Here, $d_{seed}$ represents the average particle diameter of the seed crystal and $d_{support}$ represents the pore diameter in the surface layer of the porous support.

$$1.5 < d_{support}/d_{seed} < 3.25.$$  [Formula 1]

The silicalite membrane produced by immersing the porous support, to which the seed crystal is attached thereto, and which has the relationship represented by this formula 1, in the membrane synthesis raw material composition and performing hydrothermal synthesis is dense, and because the silicalite membrane is dense, an excessive membrane thickness is not needed. The thus obtained separation membrane is characterized by having high processing efficiency, high permeability, and high separation performance.

The porous support is made of a ceramic, and it is preferred to use the porous support in which the average pore diameter of the porous support becomes smaller from the inside of the porous support toward the surface layer portion of the porous support having the silicalite membrane formed thereon.

This is because a molecule permeated the silicalite membrane penetrates in the pore of the porous support, and passes through the pore inside the porous support, and then is discharged outside the porous support, and as the pore diameter becomes larger toward the discharging side, the resistance when it passes therethrough can be reduced.

There are various methods of making the average pore diameter of the porous support smaller toward the surface layer portion of the porous support. As one example, by combining a method of providing an intermediate layer on the surface of the porous support and a method of performing an alkaline treatment, the porous support in which the average pore diameter of the porous support becomes smaller from the inside of the porous support toward the surface layer portion of the porous support having the silicalite membrane formed thereon can be produced.

For example, the porous support as a first layer is formed by molding a raw material containing alumina as a main component and $SiO_2$ as a sintering aid into a layer, followed by sintering. This porous support as the first layer is immersed in an alkali solution, followed by boiling to elute $SiO_2$, whereby the pore diameter of the porous support as the first layer is enlarged. After an alkaline treatment, an intermediate layer is provided on the surface layer portion of the porous support as the first layer. The intermediate layer is provided by molding a ceramic raw material containing alumina as a main component but not containing a sintering aid into a layer on the porous support as the first layer subjected to the alkaline treatment and sintering this molded body. After sintering, an alkaline treatment is further performed so as to elute $SiO_2$ transferred to the intermediate layer from the porous support as the first layer during sintering, whereby the average pore diameter can be made smaller toward the surface layer portion in the porous support including the porous support as the first layer and the intermediate layer.

Since the porous support has such a structure, a silicalite membrane permeable fluid easily permeates the porous support, and the passing resistance is decreased to increase the processing efficiency, and therefore, the performance as a filter material is improved.

Further, when the porous support is composed of a ceramic material, in order to connect a plurality of separation membranes in which the silicalite membrane is formed on the porous support in series, it is preferred that one end portion or both end portions in the longitudinal direction of the porous support are composed of a dense ceramic material. This is because when the end portion is a dense material, a strength required when connecting the separation membranes can be maintained, and the connection becomes easy.

There are various methods of forming one end portion or both end portions in the longitudinal direction of the porous support from a dense ceramic material. As one example, such a porous support can be produced by the method as described below.

A porous support which is composed of alumina as a main component and does not have a dense body in an end portion and a member which contains alumina in an amount of 50 wt % or more as a main component and becomes the end portion are adhered to each other by a bonding agent composed of a ceramic oxide, which contains $SiO_2$: 17 to 48 wt %, $Al_2O_3$: 2 to 8 wt %, BaO: 24 to 60 wt %, and ZnO: 0.5 to 5 wt % as essential components, and also contains at least one of $La_2O_2$, CaO, and SrO, and in which the amount of the essential components with respect to the total weight is from 80 to 84.5 wt %, and the amount of at least one of $La_2O_2$, CaO, and SrO with respect to the total weight is from 11.7 to 15.8 wt % in one end or both ends in the longitudinal direction of the porous support which does not have a dense body in the end portion, whereby a porous support in which one end portion or both end portions in the longitudinal direction are composed of a dense ceramic material is produced.

The melting temperature of this bonding agent is higher than about 600° C. which is the heat resistant limit of zeolite, and therefore, the performance of the silicalite membrane is not deteriorated due to transfer of the component of the bonding agent to the silicalite membrane even if silicalite is hydrothermally synthesized on the porous support.

Example 1: Production of Silicalite Separation Membrane

Tetra-n-propylammonium hydroxide (TPAOH) and tetraethyl orthosilicate (TEOS) were added to an aqueous solution of NaOH, whereby a mixed solution was prepared so that the molar composition of the mixed solution is as follows: $SiO_2$ (25):$Na_2O$ (0.1):TPAOH (4.4):$H_2O$ (1098): EtOH (100).

After this mixed solution was stirred at room temperature for 24 hours, hydrothermal synthesis was performed while further stirring at 100° C. A powder obtained after synthesis was washed several times with distilled water, and then, solid-liquid separation was performed by centrifugation. A solid obtained after separation was dried at 100° C. for 24 hours, followed by firing at 500° C. for 8 hours, whereby a seed crystal was produced.

Figure 4:
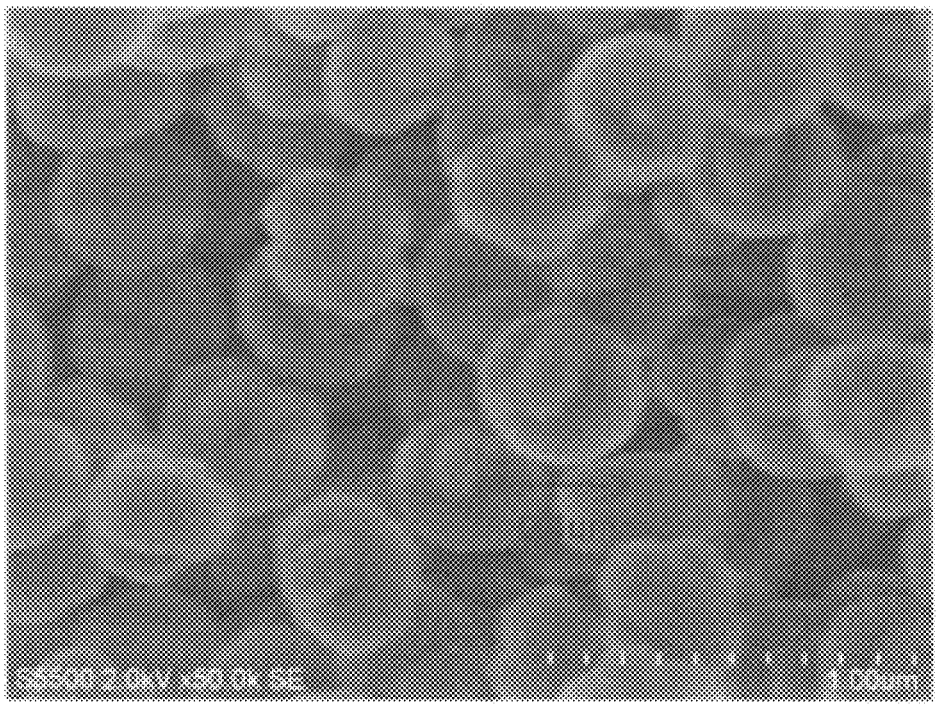
FIG. 4 is an electron microscopic image of a silicalite seed crystal used in Example 1.
Figure 5:
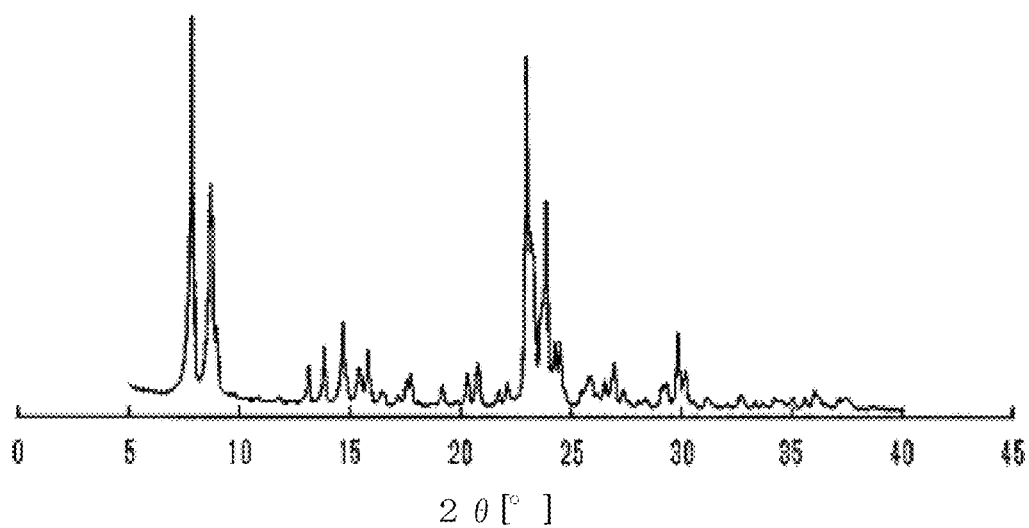
FIG. 5 is an X-ray diffraction pattern of the silicalite seed crystal used in Example 1.

An SEM photograph of the obtained seed crystal is shown in FIG. 4, and an XRD pattern of the seed crystal is shown in FIG. 5. According to the SEM photograph shown in FIG. 4, the average particle diameter of the seed crystal is about 0.4 μm, a variation is small, and the shape thereof is a neat spherical shape. According to the XRD pattern shown in FIG. 5, it is found that the seed crystal is silicalite having an MFI-type crystal structure.

Subsequently, as the porous support, an alumina porous tube (outer diameter: 16 mm, inner diameter: 12 mm) was prepared. The effective area where the silicalite membrane is formed was 10.1 $cm^2$.

The alumina porous tube was immersed in a suspension containing the silicalite seed crystal at room temperature for 24 hours, and thereafter dried at 60° C. for 12 hours, whereby the silicalite seed crystal was attached to the outer surface of the alumina porous tube.

The membrane synthesis raw material composition to be used in hydrothermal synthesis was prepared so that the composition contains colloidal silica, TPAOH, and distilled water and the molar composition of these components is as follows: $SiO_2$ (1):TPAOH (0.10):$H_2O$ (80).

After the obtained membrane synthesis raw material composition was stirred at room temperature for 1 hour, the membrane synthesis raw material composition and the alumina porous tube having the silicalite seed crystal attached to the outer surface thereof were loaded in an autoclave. After the autoclave was sealed, a hydrothermal synthesis reaction was performed at a temperature of 140° C. for 24 hours. After completion of the reaction, the alumina porous tube was taken out of the autoclave and washed several times with distilled water.

Subsequently, the alumina porous tube after completion of the hydrothermal synthesis reaction was dried at 60° C. for 12 hours, and further fired at 400° C. for 48 hours, whereby a separation membrane in which the alumina porous tube was coated with a silicalite dense layer was produced.

Figure 2:
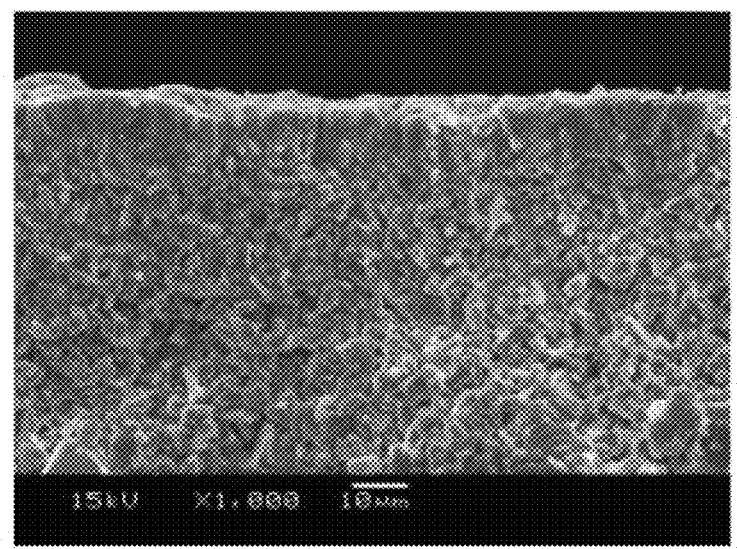
FIG. 2 is an electron microscopic image of a cross section of the silicalite membrane obtained in Example 1.

An SEM photograph of a surface of the obtained silicalite membrane is shown in FIG. 1, and an SEM photograph of a cross section thereof is shown in FIG. 2.

Figure 3:
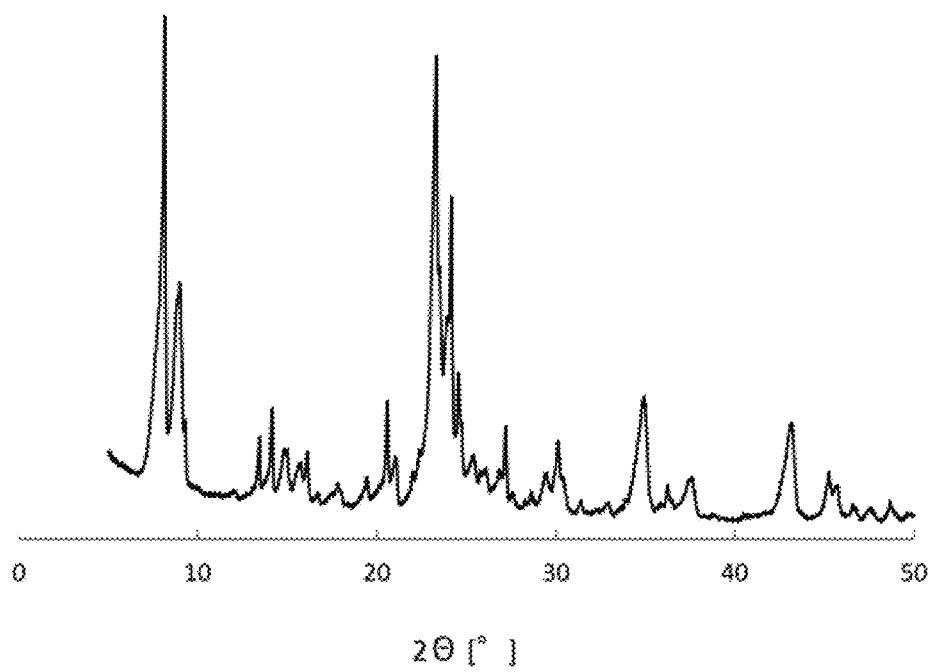
FIG. 3 is an X-ray diffraction pattern of the silicalite membrane obtained in Example 1.

An XRD pattern of the crystal of the obtained silicalite membrane is shown in FIG. 3. According to the SEM photographs shown in FIGS. 1 and 2, it is found that the surface of the crystal layer becomes a dense layer without voids, and a dense layer is formed also in the cross section. According to the XRD pattern shown in FIG. 3, it is found that the crystal is silicalite having an MFI-type crystal structure.

Example 2: Evaluation of Denseness when Changing Surface Layer Portion Average Pore Diameter of Porous Support with Respect to Average Particle Diameter of Seed Crystal The measurement of the average particle diameter of the silicalite seed crystal was performed using a particle analyzer (trade name: FPAR-1000) manufactured by Otsuka Electronics Co., Ltd. In the method of determining a cumulant average particle diameter of this analyzer, the data analysis was performed according to the MARQUARDT method.

The adjustment of the pore diameter of the porous support made of alumina was performed by changing the average particle diameter of a granulated alumina raw material and changing the firing temperature and time. The surface layer portion average pore diameter was adjusted within the range from about 0.4 μm to 1.3 μm in increments of 0.2 to 0.3 μm.

The measurement of the surface layer portion average pore diameter of the porous support was performed in accordance with JIS K 3832.

The evaluation of the denseness of the silicalite membrane was performed using a pore diameter measurement method by permeation of a non-condensable gas based on a blocking effect of capillary condensation. The principle of this method will be described.

There are a non-condensable gas which is not condensed even if the gas enters a capillary like nitrogen gas and a condensable gas which is condensed into a liquid when the gas enters a capillary like n-hexane gas. As a parameter, the permeance (also referred to as "permeation degree") of nitrogen gas is measured when nitrogen gas alone is allowed to pass through the separation membrane in which the surface layer portion average pore diameter of the porous support was changed. Further, the permeance of nitrogen gas is measured when a mixed gas of nitrogen gas and n-hexane gas is allowed to pass through the same separation membrane.

When the silicalite membrane is dense, n-hexane gas is condensed inside the pore of the silicalite membrane to close the pore of the silicalite membrane, and therefore, the permeance of nitrogen gas ought to be largely decreased.

Figure 6:
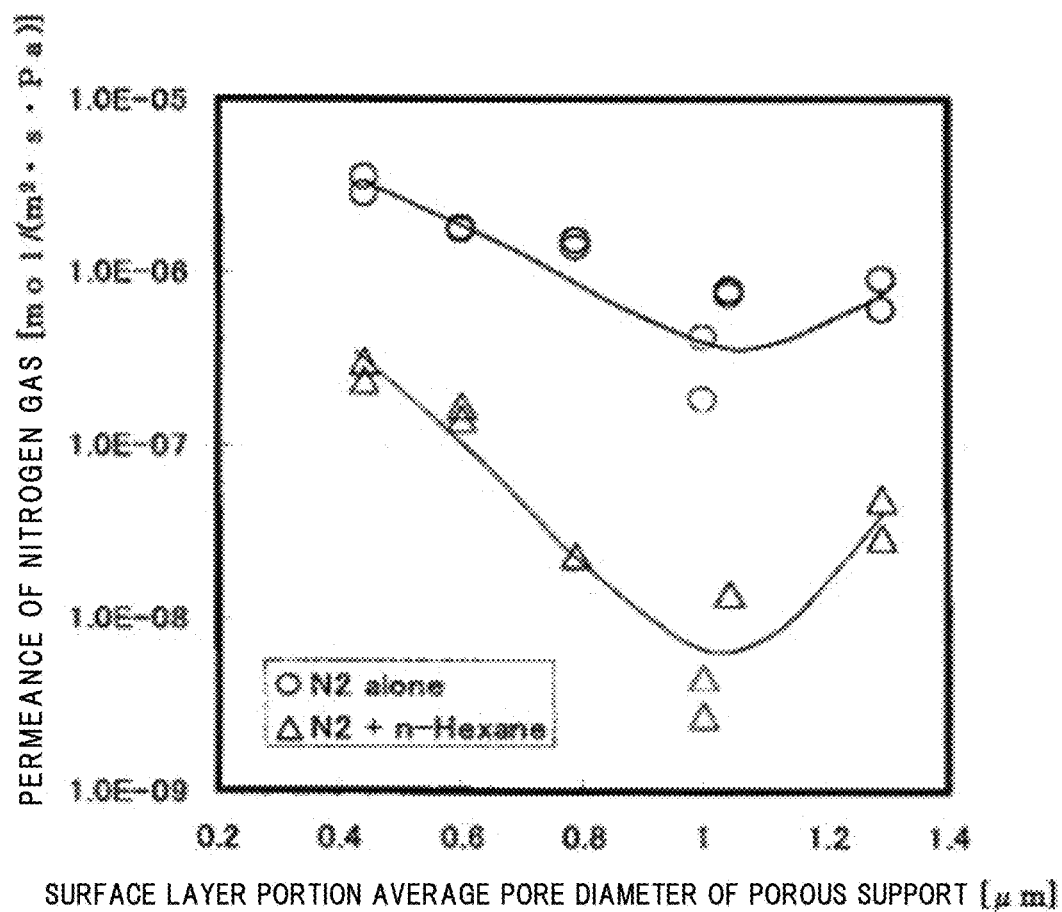
FIG. 6 shows the measurement results of the permeance of nitrogen gas measured in Example 2.

The results are shown in FIG. 6. The horizontal axis represents the surface layer portion average pore diameter (unit: μm) of the porous support, and the vertical axis represents the permeance of nitrogen gas (unit: mol/($m^2$·s·Pa)). The data obtained when nitrogen gas alone was allowed to flow are denoted by circles, and the data obtained when the mixed gas of nitrogen gas and n-hexane gas was allowed to flow are denoted by triangles. The approximate curves of the data denoted by the circles and the triangles are shown by solid lines. As the membrane is denser, the distance between these two solid lines becomes larger.

In the section in which the distance is large, the surface layer portion average pore diameter of the porous support is from 0.6 μm to 1.3 μm, and the ratio of the surface layer portion average pore diameter of the porous support to the average particle diameter of the seed crystal was from 1.5 to 3.25.

Figure 7:
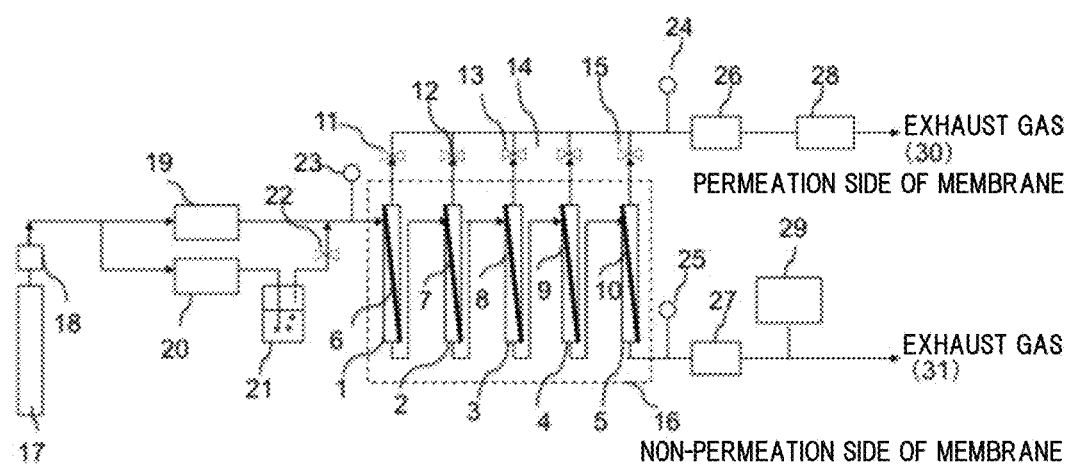
FIG. 7 is a diagram of a measurement system used in the measurement in Example 2.

FIG. 7 is a diagram of a measurement system used in the measurement of the permeance in Example 2 and schematically shows an outline structure of a body portion of the measurement device. The outline of this measurement system will be described below.

In single tube membrane modules (1) to (5), silicalite separation membrane elements (6) to (10) were installed one by one, respectively, and each of the single tube membrane modules (1) to (5) was connected so that gas on the non-permeation side of the membrane flows in series.

On the other hand, on the permeation side of the membrane, valves (11) to (15) were attached to the single tube membrane modules, respectively, and gas permeation from each of the silicalite separation membrane elements (6) to (10) can be measured individually by opening and closing the valves. Incidentally, the number of single tube membrane modules to be connected may be two or more, and the system is characterized by connecting the single tube membrane modules so that the gas on the non-permeation side of the membrane flows in series and attaching the valves individually on the permeation side of the membrane. Furthermore, the temperatures of all the single tube membrane modules were adjusted by a thermostat bath (16).

The dry gas supply (17) is performed by a gas cylinder or a compressor with a dehumidifier, and the supply pressure was regulated by a regulator (18).

The system is configured to supply a vapor at a predetermined relative pressure P/Ps (P: partial pressure, Ps: saturated vapor pressure (calculated from the pressure of the pressure gage and the temperature of a bubbler) by flow rate controllers (19) and (20) and the bubbler (21). However, in this test, dry gas (P/Ps=0) was supplied to the separation elements, and therefore, the measurement was performed in a state where a valve (22) is closed so that the vapor from the bubbler was not mixed therein.

Further, in order to calculate the permeation amount of the gas per unit pressure difference, the supply gas pressure, the pressure on the permeation side of the membrane, and the pressure on the non-permeation side of the membrane were measured by pressure gages (23) to (25). The pressure difference of the gas through the membrane was adjusted by back pressure valves (26) and (27), and the flow rate of the permeating gas was measured by a flowmeter (28). Furthermore, the density of the vapor of the gas which does not permeate the membranes of the connected single tube membrane modules was measured in real time by a vapor densitometer (29) such as a dew point meter.

With respect to exhaust gases (30) and (31), the exhaust gas (30) is nitrogen gas, and therefore is directly released to the atmosphere, however, the exhaust gas (31) is n-hexane gas, and therefore is recovered by introducing the gas into another cylinder (not shown).

The invention claimed is:

1. A method for producing a separation membrane which includes a porous support and a silicalite membrane that is formed on the support and has an MFI-type zeolite crystal structure, the method comprising:
   a step of producing a seed crystal;
   a step of attaching the seed crystal onto the porous support;
   a step of producing a membrane synthesis raw material composition containing $SiO_2$, an organic template containing a hydroxy group, and $H_2O$; and
   a step of immersing the porous support having the seed crystal attached thereto in the membrane synthesis raw material composition and performing hydrothermal synthesis,
   wherein the composition ratio of the membrane synthesis raw material composition is as follows: $SiO_2$:organic template:$H_2O$=1:(0.05 to 0.15):(50 to 120),
   wherein a main component of the porous support is alumina;
   wherein one end portion or both end portions in the longitudinal direction of the porous support is adhered to a dense ceramic material by a bonding agent, the ceramic material containing alumina in an amount of 50 wt % or more; and
   wherein the bonding agent is composed of a ceramix oxide, the ceramic oxide containing, as essential components, (i) 17 to 48 wt % of $SiO_2$, (ii) 2 to 8 wt % of $Al_2O_3$, (iii) 24 to 60 wt % of BaO, and (iv) 0.5 to 5 wt % of ZnO, an amount of the essential components with respect to a total weight of the ceramic oxide being from 80 to 84.5 wt %, the ceramic oxide also containing at least one of $La_2O_3$, CaO, or SrO, an amount of the at least one of $La_2O_3$, CaO, or SrO with respect to the total weight of the ceramic oxide being from 11.7 to 15.8 wt %.

2. The method for producing a separation membrane according to claim 1, characterized in that the organic template containing a hydroxy group is TPAOH (tetra-n-propylammonium hydroxide).

3. The method for producing a separation membrane according to claim 1, characterized in that the average particle diameter $d_{seed}$ of the seed crystal and the surface layer portion average pore diameter $d_{support}$ of the porous support have a relationship represented by the following formula (1):

$$1.5 < (d_{support}/d_{seed}) < 3.25. \quad \text{[Formula 1]}$$

4. The method for producing a separation membrane according to claim 1, characterized in that the porous support is composed of a ceramic material, and the average pore diameter of the porous support becomes smaller from the inside of the porous support toward the surface layer portion of the porous support having the silicalite membrane formed thereon.

* * * * *